US008744131B2

(12) United States Patent
Nanri et al.

(10) Patent No.: US 8,744,131 B2
(45) Date of Patent: Jun. 3, 2014

(54) PEDESTRIAN-CROSSING MARKING DETECTING METHOD AND PEDESTRIAN-CROSSING MARKING DETECTING DEVICE

(75) Inventors: Takuya Nanri, Kanagawa (JP); Hirofumi Nishimura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 338 days.

(21) Appl. No.: 13/392,148

(22) PCT Filed: Sep. 22, 2010

(86) PCT No.: PCT/JP2010/005741
§ 371 (c)(1),
(2), (4) Date: Feb. 24, 2012

(87) PCT Pub. No.: WO2011/039977
PCT Pub. Date: Apr. 7, 2011

(65) Prior Publication Data
US 2012/0148104 A1 Jun. 14, 2012

(30) Foreign Application Priority Data

Sep. 29, 2009 (JP) .................................. 2009-223976

(51) Int. Cl.
G06K 9/00 (2006.01)
(52) U.S. Cl.
USPC ........... 382/104; 382/103; 382/154; 382/190; 348/148
(58) Field of Classification Search
USPC .................. 382/103, 104, 154, 190; 348/148
See application file for complete search history.

(56) References Cited

U.S. PATENT DOCUMENTS 6,829,370 B1 * 12/2004 Pavlidis et al. ............... 382/103
7,898,437 B2 * 3/2011 Okada et al. .............. 340/995.25
(Continued)

FOREIGN PATENT DOCUMENTS

| JP | 08-055221 A | 2/1996 |
| JP | 2006-309313 A | 11/2006 |
| JP | 2009-180631 A | 8/2009 |
| WO | 2008065707 A1 | 6/2008 |

OTHER PUBLICATIONS

International Search Report for PCT/JP2010/005741 dated Oct. 19, 2010.

Primary Examiner — Jason M Repko
Assistant Examiner — Katrina Fujita
(74) Attorney, Agent, or Firm — Pearne & Gordon LLP

(57) ABSTRACT

Provided are a pedestrian-crossing marking detecting method and a pedestrian-crossing marking detecting device, wherein the existence of pedestrian crossing markings and the positions thereof can be detected accurately from within a picked up image, even when detection of the intensity edges of painted sections is difficult. In the pedestrian-crossing mark detecting device (100), a road-surface distance of a predetermined range is calculated with respect to image data picked up from the periphery of the vehicle including the road, using camera installation information or a stereo camera's distance information, and the period of the pedestrian crossing markings is calculated on the basis of the road-surface distance of the predetermined range, and furthermore, a power of frequency is calculated using an even function and odd function of a square wave of the period as the basis function. In such a way, the existence of pedestrian crossing markings and the positions thereof can be detected accurately from within the captured image, even with pedestrian crossing markings where the paint has faded.

10 Claims, 16 Drawing Sheets

(56) References Cited

U.S. PATENT DOCUMENTS

| | | |
|---|---|---|
| 7,983,447 B2 * | 7/2011 | Higuchi et al. ............... 382/103 |
| 8,064,638 B2 * | 11/2011 | Fujibayashi et al. .......... 382/103 |
| 8,184,859 B2 * | 5/2012 | Tanji ............................. 382/104 |
| 8,184,861 B2 * | 5/2012 | Nakamura et al. ............ 382/104 |
| 8,204,278 B2 * | 6/2012 | Edanami ....................... 382/104 |
| 8,213,682 B2 * | 7/2012 | Nakamura et al. ............ 382/104 |
| 8,224,031 B2 * | 7/2012 | Saito .............................. 382/104 |
| 8,229,169 B2 * | 7/2012 | Nakamura et al. ............ 382/104 |
| 8,238,606 B2 * | 8/2012 | Sasaki ........................... 382/103 |
| 8,280,105 B2 * | 10/2012 | Kishikawa et al. ........... 382/103 |
| 2005/0105771 A1 * | 5/2005 | Nagai et al. ................... 382/103 |
| 2008/0013789 A1 * | 1/2008 | Shima et al. .................. 382/104 |
| 2010/0329508 A1 * | 12/2010 | Chen et al. .................... 382/103 |

* cited by examiner

PEDESTRIAN-CROSSING MARKING DETECTING METHOD AND PEDESTRIAN-CROSSING MARKING DETECTING DEVICE

TECHNICAL FIELD

The present invention relates to a pedestrian-crossing marking detecting method and a pedestrian-crossing marking detecting device for detecting a pedestrian-crossing marking on a road surface by use of an on-vehicle camera's image.

BACKGROUND ART

The pedestrian-crossing marking in Japan is such that rectangular painted portions and non-painted portions are alternately repeated at equal widths and the painted portions and the non-painted portions are equal in width and the width is predefined at 45 cm to 50 cm. On the other hand, for the pedestrian-crossing markings in foreign countries, some markings are such that rectangular painted portions and non-painted portions are different in width, but many markings are such that the sum of the widths of the painted portion and the non-painted portion is constant and the painted portions and the non-painted portions are alternately repeated.

A conventional pedestrian-crossing marking detecting device is directed for extracting an image intensity edge which largely changes in image intensity from image data captured by a camera by use of the fact that pixels of painted portions and pixels of non-painted portions are largely different in an image intensity. Thereby, some conventional pedestrian-crossing marking detecting devices are to calculate an interval between and the number of neighboring image intensity edges and thereby to decide whether the image is a pedestrian-crossing (see Patent Literature 1). The conventional technique will be described below.

FIG. 1 is a block diagram of conventional pedestrian-crossing marking detecting device 1500 described in Patent Literature 1. In FIG. 1, stereo image data obtaining section 1501 uses a stereo camera comprising two imaging systems to obtain a pair of items of image data in which the front of a vehicle including a road surface is simultaneously captured. The image data captured in one imaging system in the pair of items of image data is assumed as target image data, and the image data captured in the other imaging system is assumed as reference image data.

Distance data calculating section 1502 stereo-matches the target image data with the reference image data thereby to calculate a distance in a real space from the stereo camera at each point within the image.

Pedestrian-crossing marking detecting section 1503 detects the existence of a pedestrian-crossing marking in the obtained target image data, and when a pedestrian-crossing marking is present on the image data, pedestrian-crossing marking detecting section 1503 detects the position thereof.

Pedestrian-crossing marking detecting section 1503 includes intensity edge detecting section 1504, width deciding section 1505, interval deciding section 1506 and repetition deciding section 1507.

Intensity edge detecting section 1504 assumes an arbitrary area in the target image data as a calculation range, and detects a intensity edge position in the calculation range. The detection of the intensity edge position within an arbitrary calculation range is performed on the entire range of the target image data. Specifically, the intensity edge position is detected by a typical image processing such as sobel filter.

Width deciding section 1505 extracts an image intensity edge changing from high intensity to low intensity as a start point from the intensity edge positions detected by intensity edge detecting section 1504, and extracts an image intensity edge changing from low intensity to high intensity as an end point therefrom. Then, width deciding section 1505 extracts, from a group of combinations of start point and end point, a combination of start point and end point for which an interval therebetween is the same as or close to a predefined width of a painted portion of the pedestrian-crossing.

Interval deciding section 1506 calculates, from a group of combinations of start point and end point extracted by width deciding section 1505, an interval between the end point in the first combination and the start point in the second combination which is positioned on the same horizontal axis as the end point in the first combination in the target image and is different from the start point in the first combination. Interval deciding section 1506 extracts the first combination in which the interval is the same as or close to a predefined width of a non-painted portion of the pedestrian-crossing.

Repetition deciding section 1507 calculates the number of repetitions of the combination of start point and end point extracted by interval deciding section 1506 in the calculation range, and when the result is the predetermined number of times or more, repetition deciding section 1507 assumes the area as a pedestrian-crossing area.

Citation List

Patent Literature

PTL 1
Japanese Patent Application Laid-Open No. 2006-309313

SUMMARY OF INVENTION

Technical Problem

However, with the conventional structure, an image intensity edge detecting method is performed assuming that an image intensity of pixels of painted portions and an image intensity of pixels of non-painted portions in a pedestrian-crossing marking are largely different from each other. Thus, since the difference in image intensity between the painted portions and the non-painted portions is small when a intensity of an edge portion as a border between the painted portion and the non-painted portion in the pedestrian-crossing marking does not clearly appear, the image intensity edge at the border between the painted portion and the non-painted portion in the pedestrian-crossing marking is difficult to detected.

It is an object of the present invention to provide a pedestrian-crossing marking detecting method and a pedestrian-crossing marking detecting device capable of accurately detecting the existence or non existence of a pedestrian-crossing marking and the position thereof from a captured image, even when intensity edges of painted portions are difficult to be detected.

Solution to Problem

A pedestrian-crossing marking detecting device according to the present invention comprises an image data obtaining section that has a first imaging system and obtains image data on a road surface captured by the first imaging system, a period calculating section that calculates a period of painted portions on the image data when the painted portions of a pedestrian-crossing marking are included in a calculation range of the image data based on coordinates of the calculation range, geometric parameters of the first imaging system and predefined values of the pedestrian-crossing marking, a frequency analyzing section that analyzes a frequency of an image intensity in the calculation range and calculates a frequency power distribution based on the basis function in which the integral multiple of the period of the painted portions is assumed as one period, an area detecting section that extracts a coordinate point at which a power level in the frequency power distribution is larger than a predetermined threshold from the calculation range and detects an area in which the coordinate point is present as a pedestrian-crossing marking area, and a position outputting section that outputs coordinate data on the pedestrian-crossing marking area in the image data.

Thereby, there is an advantage that a period of a pedestrian-crossing marking in a calculation range of image data is calculated and a frequency is analyzed at the period, so that the characteristics of a periodicity of the pedestrian-crossing marking can be extracted, and the pedestrian-crossing can be also detected even when intensity edges of the painted portions are faint.

A pedestrian-crossing marking detecting device according to the present invention is such that the period calculating section comprises a memory section that previously stores geometric parameters of the first imaging system and predefined values of the pedestrian-crossing marking therein, a parameter obtaining section that obtains the coordinates of the calculation range from the image data obtaining section and obtains the geometric parameters of the first imaging system and the predefined values of the pedestrian-crossing marking from the memory section, and a calculating section that calculates a period of the painted portions based on the coordinates of the calculation range, the geometric parameters of the first imaging system, and the predefined values of the pedestrian-crossing marking.

Thereby, there is an advantage that the previously-stored geometric parameters of the camera can be used to simplify a calculation speed by fixed parameters and to perform the processing at a higher speed.

A pedestrian-crossing marking detecting device according to the present invention is such that the period calculating section comprises a memory section that previously stores the geometric parameters of the first imaging system and the predefine values of the pedestrian-crossing marking therein, a parameter obtaining section that obtains the coordinates of the calculation range from the image data obtaining section and obtains the geometric parameters of the first imaging system and the predefined values of the pedestrian-crossing marking from the memory section, a rotation detecting section that has a sensor for detecting a change in angle speed, and when a change in angle speed detected by the sensor is larger than a predetermined threshold, detects a rotation of the pedestrian-crossing marking detecting device, an angle calculating section that when a rotation of the pedestrian-crossing marking detecting device is detected, calculates a rotation angle based on a change value of the angle speed detected by the sensor, and a calculating section that calculates a period of the painted portions based on the coordinates of the calculation range, the geometric parameters of the first imaging system, the predefined values of the pedestrian-crossing marking, and the rotation angle.

Thereby, there is an advantage that the period calculating section can calculate a period of painted portions in a calculation range when the painted portions of a pedestrian-crossing marking are present in the calculation range even while a vehicle is rotating.

A pedestrian-crossing marking detecting device according to the present invention further comprises a distance calculating section that calculates a distance in a real space between the first imaging system and a road surface indicated in the calculation range as distance data based on the coordinates of the calculation range included in the image data and the geometric parameters of the first imaging system, wherein the period calculating section calculates a period of painted portions when the painted portions of a pedestrian-crossing marking are included in the calculation range based on the distance data and the predefined values of the pedestrian-crossing marking, and the position outputting section outputs coordinate data on the pedestrian-crossing marking area in the image data, and the distance data.

Thereby, there is an advantage that it is possible to detect even a pedestrian-crossing marking for which intensity edges of painted portions are difficult to be detected, and it is possible to detect a distance in a real space between a camera and the pedestrian-crossing marking.

A pedestrian-crossing marking detecting device according to the present invention further comprises a stereo matching section and a distance calculating section, wherein the image data obtaining section further has a second imaging system, and obtains target image data in which a road surface is captured by the first imaging system and reference image data in which the road surface is captured by the second imaging system, the stereo matching section calculates an evaluation value distribution indicating a difference in image intensity between a target point of the target image data and multiple search points of the reference image data, and calculates a distance in a real space between the first imaging system and the road surface captured in the target image data, as first distance data, based on a disparity calculated based on the evaluation value distribution, a focal length of the first imaging system, and a distance between the first imaging system and the second imaging system, the distance calculating section calculates 3D voxel data of the target image data based on the first distance data, and calculates a distance in a real space between the first imaging system and the road surface indicated in the calculation range included in the target image data as second distance data based on the 3D voxel data, the period calculating section calculates a period of painted portions when the painted portions of a pedestrian-crossing marking are included in the calculation range based on the second distance data and the predefined values of the pedestrian-crossing marking, and the position outputting section outputs coordinate data on the pedestrian-crossing marking area in the target image data, and the second distance data.

Thereby, there is an advantage that it is possible to accurately calculate a period of a pedestrian-crossing marking against vehicle's bouncing, pitching or road-surface's inclination.

A pedestrian-crossing marking detecting device according to the present invention is such that the geometric parameters of the camera are an installation pitch angle, an installation height, a focal length and a pixel pitch of the camera.

Thereby, there is an advantage that a period of a pedestrian-crossing can be more accurately calculated based on a camera specification or installation specification.

A pedestrian-crossing marking detecting device according to the present invention is such that the frequency analyzing section analyzes a frequency based on the basis function in which one period is twice as much as the period of the painted portions.

Thereby, there is an advantage that a pattern other than a pedestrian-crossing marking and similar to a pedestrian-crossing marking is less likely to be erroneously detected.

A pedestrian-crossing marking detecting device according to the present invention is such that the area detecting section controls the predetermined threshold based on an illumination of a surrounding area of the vehicle.

Thereby, there is an advantage that an accuracy in detection of a pedestrian-crossing marking can be enhanced even when a surrounding area is dark and many gain noises are present, for example, during nighttime.

A pedestrian-crossing marking detecting method according to the present invention comprises the steps of: obtaining image data on a road surface captured by an imaging system; calculating a period of painted portions when the painted portions of a pedestrian-crossing marking are included in a calculation range of the image data based on coordinates of the calculation range, geometric parameters of the imaging system, and predefined values of the pedestrian-crossing marking; performing a frequency analysis of an image intensity in the calculation range and calculating a frequency power distribution based on the basis function in which the integral multiple of the period of the painted portions is assumed as one period; extracting a coordinate point at which a power level in the frequency power distribution is larger than a predetermined threshold from the calculation range and detecting an area in which the coordinate point is present as a pedestrian-crossing marking area; and outputting coordinate data on the pedestrian-crossing marking area in the image data.

Thereby, there is an advantage that a period of a pedestrian-crossing marking in a calculation range of image data is calculated and a frequency is analyzed at the period, so that the characteristics of a periodicity of the pedestrian-crossing marking can be extracted and the pedestrian-crossing marking can be detected even when intensity edges of painted portions are faint.

Advantageous Effects of Invention

According to the present invention, a period of a pedestrian-crossing marking is calculated in a calculation range of image data and a frequency is analyzed at the period, so that the characteristics of a periodicity of the pedestrian-crossing marking can be extracted; and detection can be performed without detecting intensity edges of painted portions of the pedestrian-crossing, so that the pedestrian-crossing marking can be detected even when the intensity edges of the painted portions are difficult to be detected.

DESCRIPTION OF EMBODIMENTS (Embodiment 1)

Figure 1:
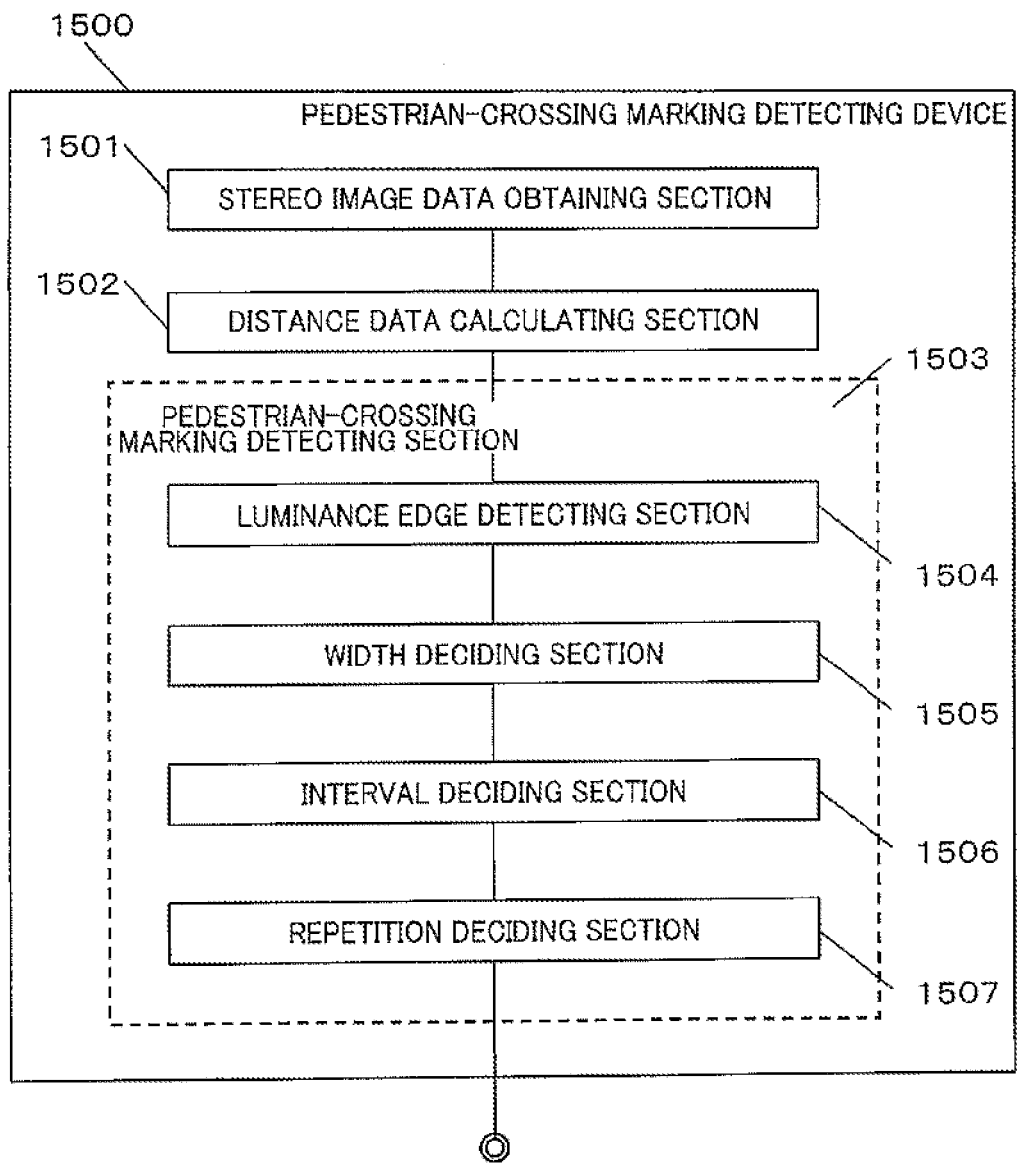
FIG. 1 is a diagram showing a block structure of a conventional pedestrian-crossing marking detecting device.
Figure 2:
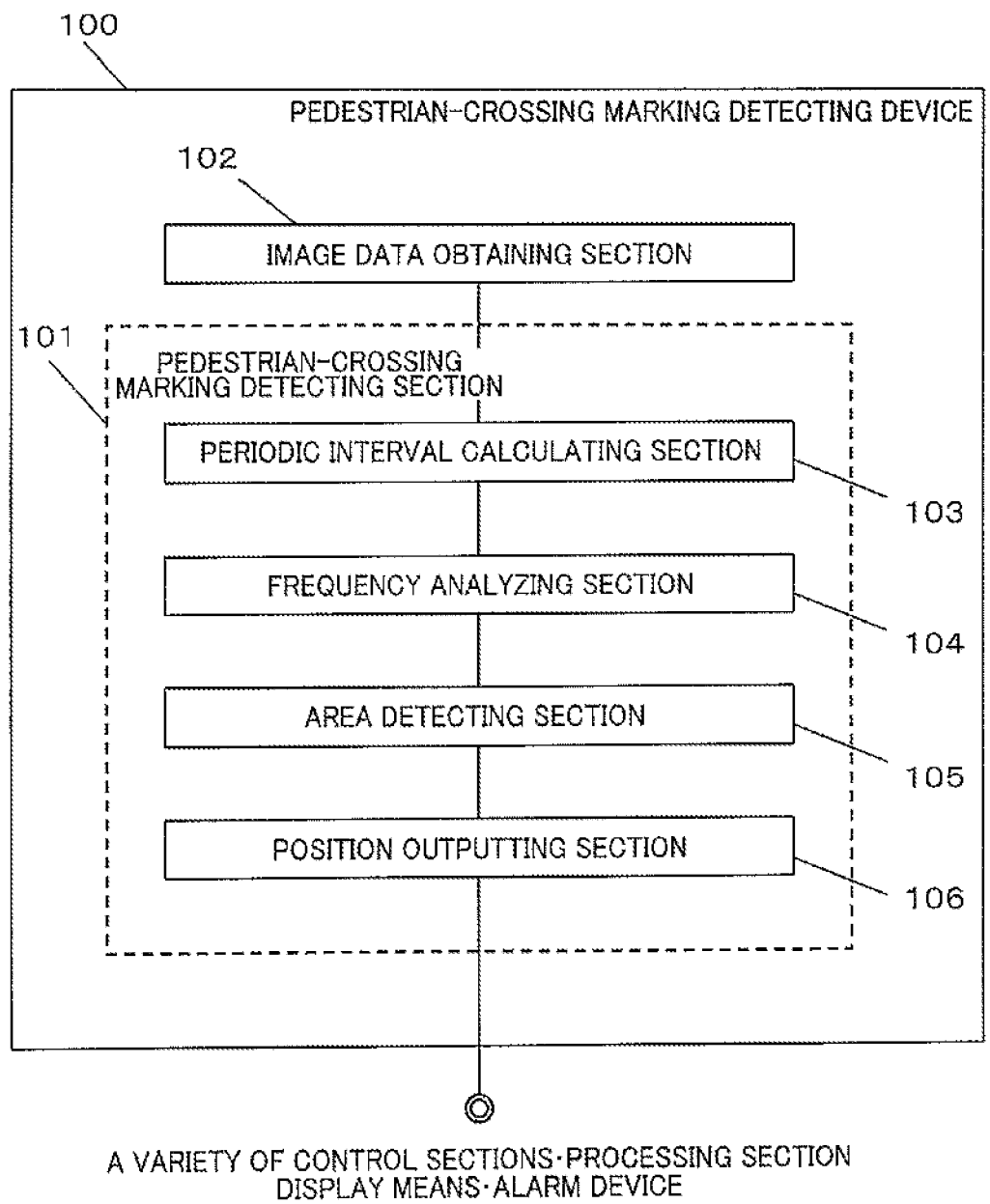
FIG. 2 is a diagram showing a block structure of a pedestrian-crossing marking detecting device according to Embodiment 1 of the present invention.

FIG. 2 shows a block structure of pedestrian-crossing marking detecting device 100 according to Embodiment 1 of the present invention. Pedestrian-crossing marking detecting device 100 shown in FIG. 2 includes pedestrian-crossing marking detecting section 101 and image data obtaining section 102. Pedestrian-crossing marking detecting section 101 includes period calculating section 103, frequency analyzing section 104, area detecting section 105 and position outputting section 106.

A pedestrian-crossing marking detecting device and a pedestrian-crossing marking detecting method according to Embodiment 1 of the present invention will be described below.

Image data obtaining section 102 obtains image data on a road by an on-vehicle camera. The image data is a still image and will be described assuming that the horizontal axis is X axis and the longitudinal axis is Y axis. An explanation will be made assuming that one pixel on the screen is a coordinate point. Embodiment 1 describes that the on-vehicle camera is a camera comprising one imaging system, but the present invention is not limited thereto.

Figure 3A:
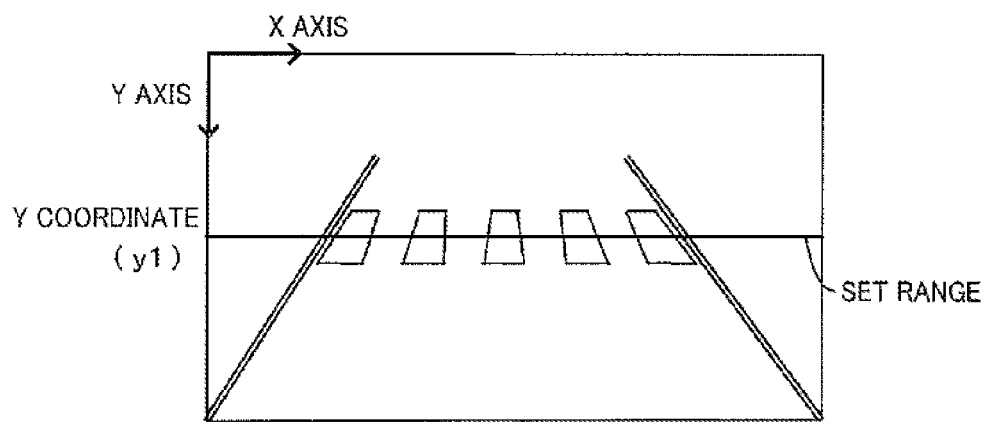
FIG. 3 is a diagram showing a positional relationship between image data on a road surface obtained by an on-vehicle camera, the on-vehicle camera, and the road surface.
Figure 3B:
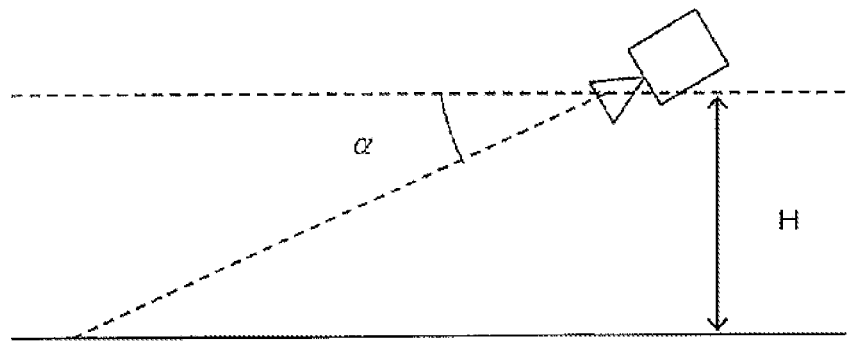

FIG. 3 shows a positional relationship between image data on a road surface obtained by the on-vehicle camera, the on-vehicle camera, and the road surface. Specifically, FIG. 3A shows the image data on the road surface obtained by the on-vehicle camera and FIG. 3 shows a positional relationship between the on-vehicle camera and the road surface. An explanation will be made below assuming that the on-vehicle camera is installed on the front of the vehicle with installation height H and installation pitch angle α as shown in FIG. 3B, and there is no installation roll angle, which is a horizontal rotation angle relative to the imaging direction of the on-vehicle camera. Even when the on-vehicle camera is installed behind or on the side of a vehicle, or even when the installation roll angle is present, the present invention may be embodied.

In pedestrian-crossing marking detecting section 101, period calculating section 103 obtains image data obtained by image data obtaining section 102 and selects, as a calculation range, horizontally-arranged ranges in which a Y coordinate in the image data is an arbitrary Y coordinate (y1) as shown in FIG. 3A.

Period calculating section 103 calculates a period of painted portions in the image data when the painted portions of a pedestrian-crossing marking are included in the calculation range. The period calculation is uniformly performed on the image data irrespective of whether the pedestrian-crossing marking is actually captured in the image data.

The period of the painted portions is calculated based on the positional relationship between the on-vehicle camera and the road surface, the Y coordinate (y1), and the period of the painted portions of the pedestrian-crossing in a real space, and does not depend on the object captured in the image data.

Frequency analyzing section 104 analyzes a frequency of an image intensity in the calculation range and calculates a distribution of frequency power P(x) based on the basis function in which the period of the painted portions calculated by period calculating section 103 is assumed as one period.

Area detecting section 105 detects an area in which a power level exceeds a predetermined threshold as an area in which a pedestrian-crossing marking is present from the distribution of frequency power P(x) calculated by frequency analyzing section 104. Herein, the frequency power P(x) indicates a power distribution in the calculation range of the frequency for which the period of the painted portions is assumed as one period.

Each processing in the calculation range for an arbitrary Y coordinate (y1) described above is performed on all the Y coordinates in the image data, that is, a Y coordinate (y1) to another Y coordinate (ym) (m:integer). An area in which a pedestrian-crossing marking is present in the image data is detected. m (m:integer) is the number of pixels on the Y axis in the image data.

Position outputting section 106 outputs coordinate data on the detected area in which a pedestrian-crossing marking is present.

A function of each component included in pedestrian-crossing marking detecting section 101 will be described below in detail.

Period calculating section 103 selects, from the image data on the road surface captured by image data obtaining section 102, a range formed of horizontally-arranged pixels in which the Y coordinate is an arbitrary Y coordinate (y1) in the image data, as a calculation range, as shown in FIG. 3A. The calculation range is described as being configured of all the horizontally-arranged coordinate points at which the Y coordinate is an arbitrary Y coordinate (y1), but the Y coordinate may be a coordinate point positioned in an arbitrary range among the horizontally-arranged coordinate points at which the Y coordinate is a Y coordinate (y1).

Period calculating section 103 calculates a period of the painted portions when the painted portions of the pedestrian-crossing marking are included in the calculation range of the image data. The period calculation is uniformly performed on the image data for subsequent processings irrespective of whether a pedestrian-crossing marking is actually captured in the image data.

Figure 4:
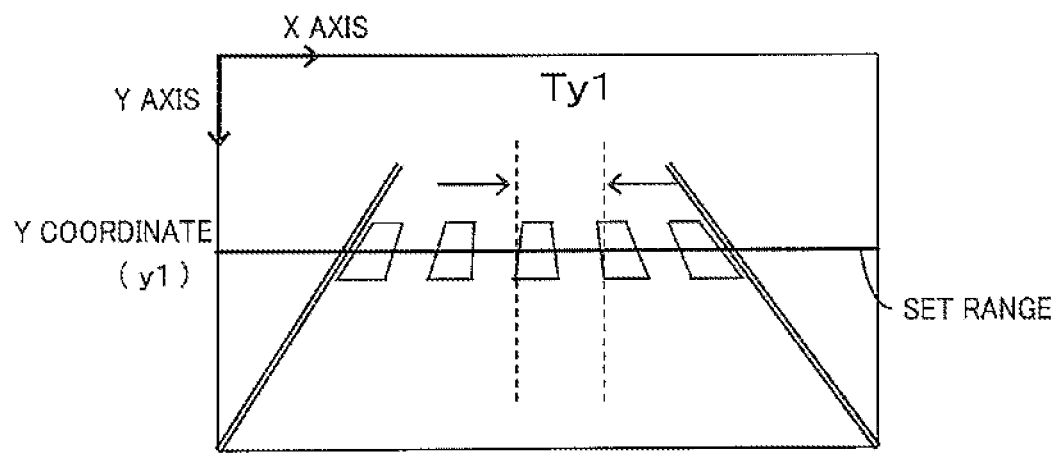
FIG. 4 is a diagram showing image data in which a pedestrian-crossing marking is captured.

FIG. 4 shows image data when a pedestrian-crossing marking is captured. Herein, a function of period calculating section 103 will be described assuming that the calculation range includes all the horizontally-arranged coordinate points at the Y coordinate (y1).

Period calculating section 103 obtains the image data obtained by image data obtaining section 102, and selects the calculation range as described above. Period calculating section 103 calculates a period Ty1 of the painted portions in the calculation range on the image data when the painted portions are included in the calculation range, as shown in FIG. 4, irrespective of whether a pedestrian-crossing marking is present in the image data. The period Tyn (n: integer) is calculated because when a pedestrian-crossing marking is displayed in the image data, if the Y coordinate is different, the width and interval of the painted portions are different.

The period Tyn (n: integer between 1 and m) of the painted portions is the sum of the width of the painted portion of the pedestrian-crossing marking at each Y coordinate (yn) (n: integer between 1 and m) and the interval of the painted portions, and the width and the interval (that is, the width of non-painted portions) of the painted portions in the real space have the same value under the rule of Japan. Therefore, according to the rule of Japan, the period Tyn (n: integer between 1 and m) is twice the width of the painted portion in the image data or the interval of the painted portions. In other words, the period Tyn is the sum of the width of the painted portion in the image data and the interval of the painted portions (that is, the width of the non-painted portion).

On the other hand, as in foreign countries, even when the widths of a painted portion and a non-painted portion of a pedestrian-crossing marking are different, the sum of the width of the painted portion and the width of the non-painted portion is constant, and the painted portions and the non-painted portions are alternately repeated, similarly, the period Tyn (n: integer between 1 and m) is the sum of the width of the painted portion in the image data and the width of the non-painted portion therein.

Figure 5:
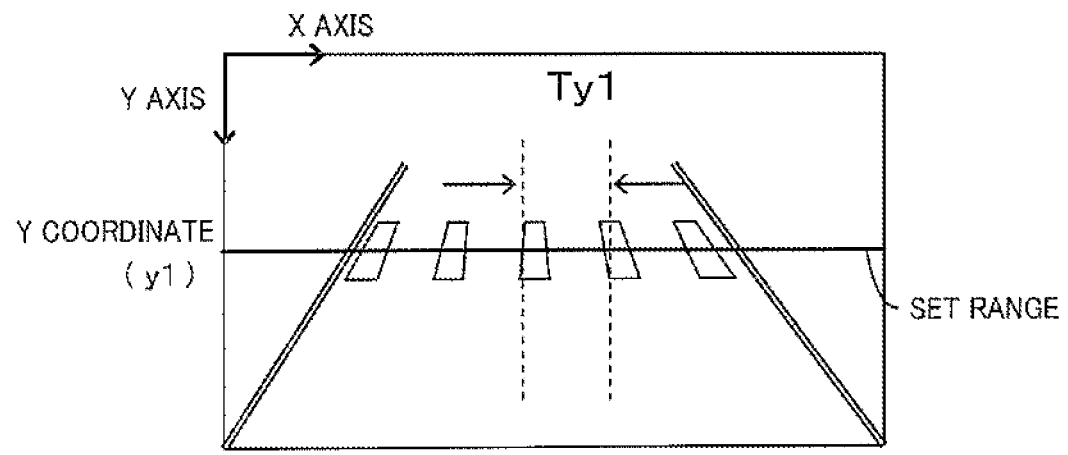
FIG. 5 is a diagram showing image data in which a pedestrian-crossing marking is captured.

FIG. 5 shows image data in which a pedestrian-crossing marking is captured, in when the widths of a painted portion and a non-painted portion of a pedestrian-crossing marking are different, the sum of the width of the painted portion and the width of the non-painted portion is constant, and the painted portions and the non-painted portions are alternately repeated.

The period Tyn is calculated from Equation 1 by use of the width or interval (W) of the painted portion of the pedestrian-crossing marking in the real space, the coordinate (y) of the calculation range, and the geometric parameters of the camera. The geometric parameters of the camera are the camera's installation parameters including an installation pitch angle α, a camera installation height H, a camera focal length f, and a Y axis pixel pitch dpy. yc in Equation 1 is the center coordinate of the Y axis.

(Equation 1)

$$T_{yn} = \frac{2 \cdot W \cdot f \cdot \sin(\alpha + \theta_{yn})}{H \cdot \cos\theta_{yn}}; \theta_{yn} = \arctan\left(\frac{dp_y \cdot (y_n - y_c)}{f}\right) \quad [1]$$

(n: Integer between 1 and m)

The width or interval (that is, the interval is the width of the non-painted portion) of the painted portion of the pedestrian-crossing marking is indicated as W in Equation 1, but when the sum of the width of the painted portion of the pedestrian-crossing marking and the width of the non-painted portion thereof is assumed as W', Equation 2 is obtained.

(Equation 2)

$$T_{yn} = \frac{W' \cdot f \cdot \sin(\alpha + \theta_{yn})}{H \cdot \cos\theta_{yn}}; \theta_{yn} = \arctan\left(\frac{dp_y \cdot (y_n - y_c)}{f}\right) \quad [2]$$

(n: integer between 1 and m)

By use of Equation 2, also when as in foreign countries, the widths of a painted portion and a non-painted portion of a pedestrian-crossing marking are different, the sum of the width of the painted portion and the width of the non-painted portion is constant, and the painted portions and the non-painted portions are alternately repeated, Tyn can be calculated.

The drawings in the following explanation show a case in which the width of the painted portion in the image data is equal to the width of the non-painted portion, but do not intend to limit the present invention, and the present invention is also applicable when the width of the painted portion in the image data is different from the width of the non-painted portion.

Figure 6:
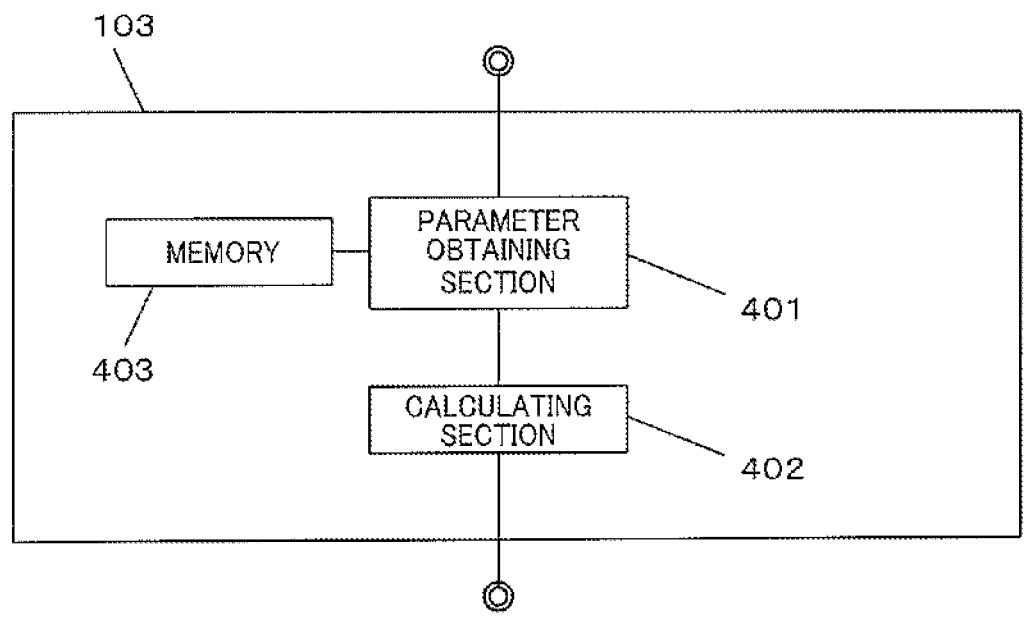
FIG. 6 is a diagram showing a structure of a period calculating section.

FIG. 6 shows a structure diagram of period calculating section 103. Period calculating section 103 includes parameter obtaining section 401, calculating section 402 and memory 403. Memory 403 previously stores the geometric parameters of the camera and the predefined values of the pedestrian-crossing marking therein. Herein, the predefined values of the pedestrian-crossing marking include the width of the painted portion of the pedestrian-crossing marking and the width of the non-painted portion. In other words, the predefined values of the pedestrian-crossing marking include at least one of the width of the painted portion of the pedestrian-crossing marking, the width of the non-painted portion thereof, and the sum of the width of the painted portion and the width of the non-painted portion.

Parameter obtaining section 401 obtains the image data from image data obtaining section 102 and selects the Y coordinate (yn) of the calculation range, thereby reading the geometric parameters of the camera and the predefined values of the pedestrian-crossing marking from memory 403. Calculating section 402 uses Equation 1 or Equation 2 to calculate Tyn based on the geometric parameters of the camera obtained by parameter obtaining section 401, the Y coordinate (yn) of the calculation range, and the predefined values of the pedestrian-crossing marking.

Frequency analyzing section 104 analyzes a frequency of an image intensity in the calculation range by using an even function and an odd function of a square wave having one period Ty1 as the basis function. A frequency power P(x) in the calculation range is calculated by the frequency analysis.

Figure 7A:
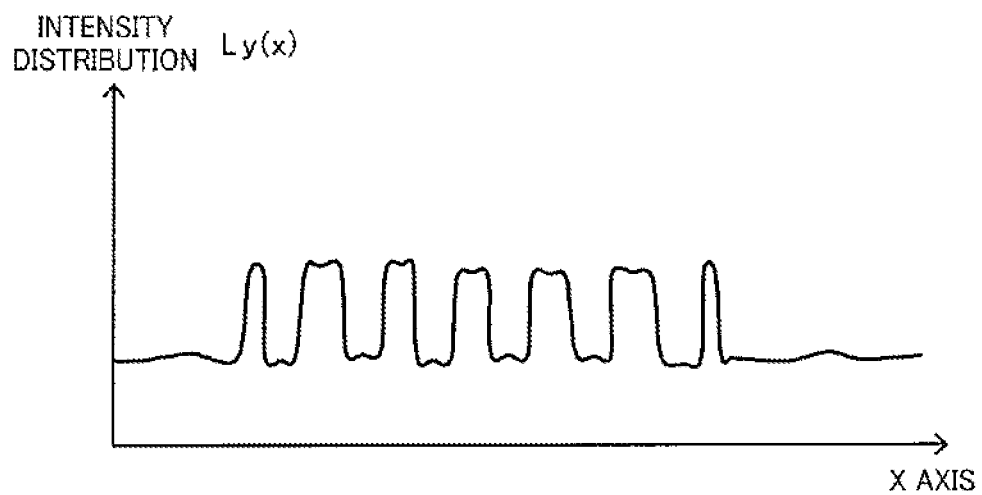
FIG. 7 is a diagram for explaining a frequency analyzing method.
Figure 7C:
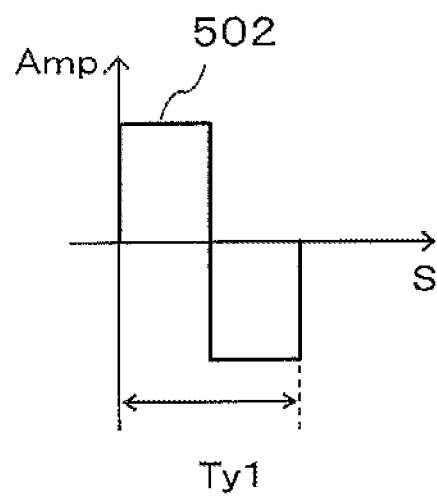
Figure 7B:
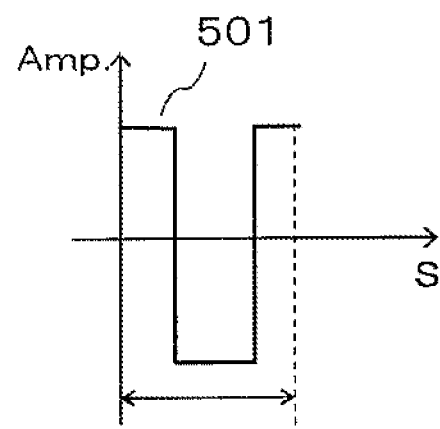

FIG. 7 is a diagram for explaining a frequency analyzing method. FIG. 7A shows a intensity distribution Ly1(x) in the calculation range, FIG. 7B shows an even function u(s) 501 in the basis function used for the frequency analysis in the calculation range, and FIG. 7C shows an odd function v(s) 502 in the basis function.

The frequency power P(x) is calculated by Equation 3 based on the inner products Au(x) and Av(x) calculated by the use of the even function u(s) and the odd function v(s).

(Equation 3)

$$A_u(x) = \sum_s L_y(x+s) \cdot u(s)$$
$$A_v(x) = \sum_s L_y(x+s) \cdot v(s)$$
$$P(x) = \sqrt{A_u(x)^2 + A_v(x)^2}$$

[3]

In the frequency analyzing method according to the present invention, the powers of the two orthogonal basis functions are calculated, and the frequency power P(x) has the same value at any position (x) in the pedestrian-crossing marking, and thus the area of the pedestrian-crossing marking can be easily calculated.

There will be described a case in which the width of the painted portion in the image data is equal to the width of the non-painted portion, in association with the fact that the frequency power P(x) has the same value at any position (x) in the pedestrian-crossing marking.

In the calculation range at any Y coordinate (y1), when the pedestrian-crossing marking at the period Ty1=8 is the image data with a intensity distribution Ly1(x)=[200, 200, 200, 200, 10, 10, 10, 10, 200, 200, 200, 200], the x coordinate with the intensity value of 200 indicates the painted portion, and the x coordinate with the intensity value of 10 indicates the non-painted portion between the painted portions.

When the even function of the basis function is u(s)=[1, 0, −1, −1, −1, 0, 1, 1] and the odd function is v(s)=[1, 1, 1, 0, −1, −1, −1, 0], the inner product of the intensity distribution of x=0 to x=7 and the even function u(s) is Au(0)=200*1+ 200*04−200*(−1)+200*(−1)+10*(−1)+10*1+10*1+=−190. On the other hand, the inner product of the intensity distribution of x=0 to x=7 and the odd function v(s) is Av(0)=200*1+ 200*1+200*1+200*0+10*(−1)+10*(−1)*10*(−1)+10*0= 570. The frequency power P(0) is 600.8 from Equation 3.

Similarly, the inner product of the intensity distribution of x=1 to x=8 and the even function u(s) is Au(1)=200*1+ 200*0+200*(−1)+10*(−1)+10*(−1)+10*0+10*1+200*1= 190. On the other hand, the inner product of the intensity distribution of x=1 to x=8 and the odd function v(s) is Av(1)= 200*1+200*1+200*(−1)+10*0+10*(−1)+10*(−1)+ 10*(−1)+200*0=570. The frequency power P(1) is 600.8 from Equation 3 and is equal to P(0).

Similarly, P(2)=P(3)=P(4)=600.8 is obtained, and the same frequency power is obtained at any positions (x) of the pedestrian-crossing marking.

Then, there will be described a case in which the width of the painted portion in the image data is different from the width of the non-painted portion in association with the fact that the frequency power P(x) has the same value at any position (x) in the pedestrian-crossing marking.

In other words, according to the present embodiment, there will be described a case in which the pedestrian-crossing marking at the period Ty1=8 has the intensity distribution Ly1(x)=[200, 200, 10, 10, 10, 10, 10, 10, 200, 200, 10, 10] in the calculation range at any Y coordinate (y1). In this case, the number of pixels, that is, the width is different between the painted portion having the intensity value of 200 and the non-painted portion having the intensity value of 10.

The even function of the basis function is assumed as u(s)=[1, 0, −1, −1, −1, 0, 1, 1] and the odd function is assumed as v(s)=[1, 1, 1, 0, −1, −1, −1, 0]. The basis function whose frequency is lowest in the square wave is used like when the width of the painted portion in the image data is equal to the width of the non-painted portion.

The inner product of the intensity distribution of x=0 to x=7 and the even function u(s) is Au(0)=200*1+200*0+10*(−1) +10*(−1)+10*(−1)+10*0+10*1+10*1=190. On the other hand, the inner product of the intensity distribution of x=0 to x=7 and the odd function v(s) is Av(0)=200*1+200*1+10*1+ 10*0+10*(−1)+10*(−1)*10*(−1)+10*0=380. The frequency power P(0) is 424.9 from Equation 3.

Similarly, the inner product of the intensity distribution of x=1 to x=8 and the even function u(s) is Au(1)=200*1+10*0+ 10*(−1)+10*(−1)+10*(−1)+10*0+10*1+200*1=380. On the other hand, the inner product of the intensity distribution of x=1 to x=8 and the odd function v(s) is Av(1)=200*1+10*1+ 10*1+10*0+10*(−1)+10*(−1)+10*(−1)+200*0=190. The frequency power P(1) is 424.9 from Equation 3 and is equal to P(0).

Similarly, P(2)=P(3)=P(4)=424.9 is obtained and the same frequency power is obtained at any position (x) in the pedestrian-crossing marking.

A high frequency component indicating a narrow painted portion increases more when the width of the painted portion is different from the width of the non-painted portion than when the width of the painted portion is equal to the width of the non-painted portion. Since the odd function and the even function are configured of a square wave having the lowest frequency, that is, a square wave having the equal period, the high frequency component cannot be extracted only by odd function and even function having one period, and the frequency power is reduced. Thus, when the width of the painted portion is different from the width of the non-painted portion, a threshold of a power level set by area detecting section 105 needs to be changed according to the level of predefined width and interval.

Even when the threshold of the power level set by area detecting section 105 is lowered, it is less likely to be erroneously detected in an actual traffic environment. This is because when the frequency power increases, the magnitude of one period is equal to the predefined value, and the width of the painted portion and the width of the non-painted portion are repeated more equally. However, in the actual traffic environment, the pattern is not present in other than the pedestrian-crossing-mark.

As described above, the threshold of the power level set by area detecting section 105 is changed according to the ratio of the predefined width and interval so that even when the width of the painted portion of the pedestrian-crossing marking in the image data and the width of the non-painted portion therein are different, the pedestrian-crossing marking can be detected.

The basis function has been described as the even function of $u(s)=[1, 0, -1, -1, -1, 0, 1, 1]$ and the odd function of $v(s)=[1, 1, 1, 0, -1, -1, -1, 0]$, but is not limited thereto. In other words, the number of elements in each function and the order of numerical values are not limited to the above basis function.

Since the frequency analysis by square wave is not influenced by the orthogonal components of the intensity distribution of the image data, and can extract only the frequency power with a square wave having the period $Ty1$, so that even when the illumination of the road surface changes, the frequency power of the pedestrian-crossing marking is unchanged and thus the frequency analysis is a stable detecting system. The invariance of the frequency power relative to the illumination of the road surface will be described below.

When there are present, in the calculation range, image data on the pedestrian-crossing marking having the period $Ty1=8$ of $Ly1(x)=[200, 200, 200, 200, 10, 10, 10, 10]$ and image data of $Ly2(x)=[210, 210, 210, 210, 20, 20, 20, 20]$, assuming that the even function of the basis function is $u(s)=[1, 0, -1, -1, -1, 0, 1, 1]$ and the odd function is $v(s)=[1, 1, 1, 0, -1, -1, -1, 0]$, the inner product of the intensity distribution $Lx1(x)$ and the even function $u(s)$ is $Au1(0)=200*1+200*1+200*1+200*0+10*(-1)+200'(-1)+10*(-1)+10*0+10*1+10*1=-190$. On the other hand, the inner product of the intensity distribution $Lx1(x)$ and the odd function $v(s)$ is $Av1(0)=200*1+200*1+200*1+200*0+10*(-1)+10*(-1)+10*(-1)+10*0=570$. The frequency power is 600.8 from -190 and the square root of 570.

Similarly, the inner product of the intensity distribution $Ly2(x)$ function $u(s)$ is and the even $Au2(0)=210*1+210*0+210*(-1)+210*(-1)+20*(-1)+20*0+20*1+20*1=190$. On the other hand, the inner product of the intensity distribution $Ly2(x)$ and the odd function $v(s)$ is $Av2(0)=210*1+210*1+$ 210*1+210*0+210*(-1)+20*(-1)+20*(-1)+20*0=570. The frequency power P2(0) is 600.8 from Equation 3 and is equal to P1(0).

A typical frequency analysis uses the trigonometric function as the basis function to calculate FFT and thus many multiplications are needed for the inner product of image signal and trigonometric function, while the frequency analyzing method according to the present invention uses the square wave as the basis function to calculate FFT and thus an image signal is simply added for the inner product calculation, thus the inner product can be fast calculated.

The period of the basis function is set to the period $Ty1$ by way of example, and the period of the basis function may be set to twice as much as $Ty1$ or three times as much as $Ty1$, and the present invention is not limited thereto.

The period of the basis function is set twice as much as $Ty1$ and thus a pattern which is other than a pedestrian-crossing marking but is similar to a pedestrian-crossing marking is less likely to be erroneously detected. On the other hand, the frequency analyzing method using the basis function whose period is twice as much as $Ty1$ is such that an area decided as a pedestrian-crossing marking is smaller, and thus is suitable for roughly detecting a position of the pedestrian-crossing marking.

Area detecting section 105 extracts a coordinate (x) at which the power level exceeds the predetermined threshold from the distribution of frequency power P(x) calculated by frequency analyzing section 104, and detects an area in which the extracted x coordinate is closely present as an area in which a pedestrian-crossing marking is present.

Figure 8A:
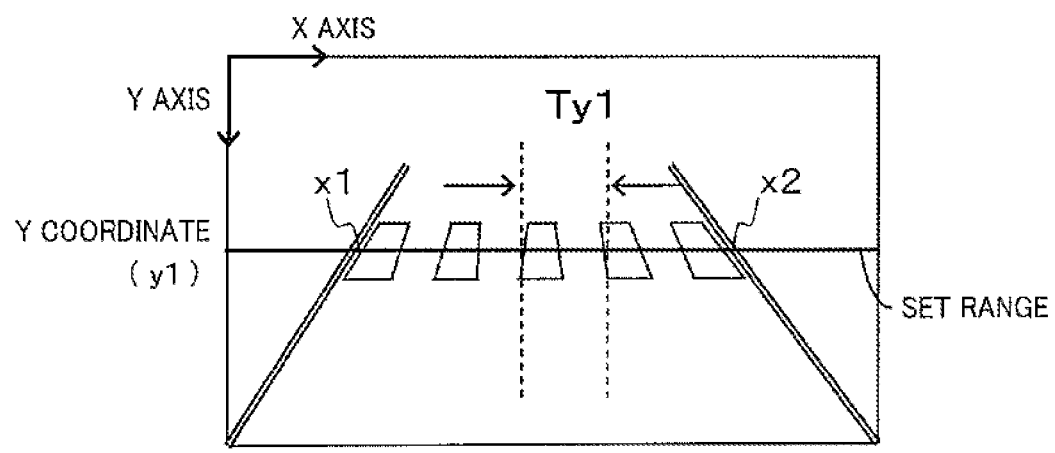
FIG. 8 is a diagram for explaining a method for detecting an area in which a pedestrian-crossing marking is present.
Figure 8B:
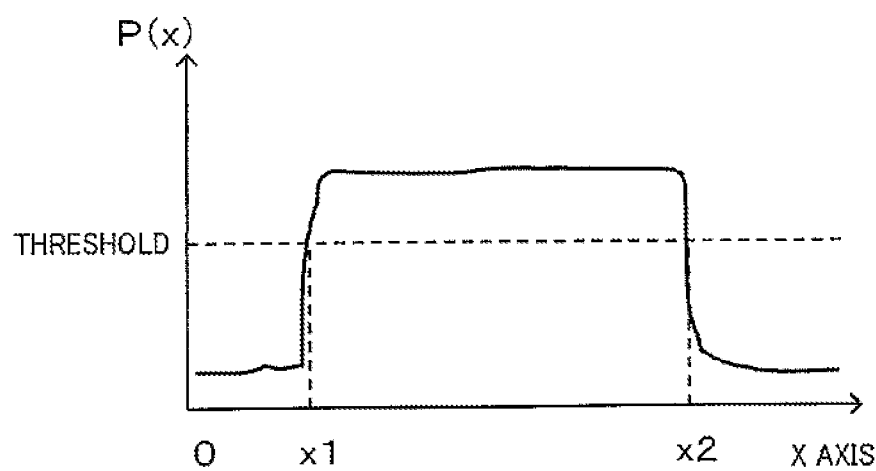

FIG. 8 is a diagram for explaining a method for detecting an area in which a pedestrian-crossing marking is present. FIG. 8A shows image data in which a pedestrian-crossing marking is captured in a method for detecting an area in which a pedestrian-crossing marking is present from a distribution of frequency power P(x) in a calculation range, and FIG. 8B shows a distribution of frequency power P(x) in the calculation range.

In FIG. 8B, an x coordinate at which the frequency power P(x) exceeds a predetermined threshold is a coordinate point in $x1 \leq x \leq x2$, which indicates that a pedestrian-crossing marking is present between x1 and x2 in the calculation range.

The predetermined threshold has been described as a fixed value, but frequency analyzing section 104 may decide an illumination of a surrounding area and the like, and may set the predetermined threshold as a variable value to be changed depending on the decision result. Thereby, even when a surrounding area is dark and many gain noises are present, for example, during nighttime, the threshold is varied to be lower, and thus a pedestrian-crossing marking is detected irrespective of a intensity edge.

The period calculation, frequency analysis and area calculation as to the calculation range at any Y coordinate (y1) on the image data are performed on all the Y coordinates of the image data, that is, from a Y coordinate (y1) to a Y coordinate (ym) (m: integer) by scanning.

A series of processing are performed on all the Y coordinates in the above explanation, but a series of processing may be performed on an arbitrary range. For example, the arbitrary range is from a vanishing point to the lowest end of the screen. The vanishing point means a point where parallel lines cross in perspective.

Figure 9A:
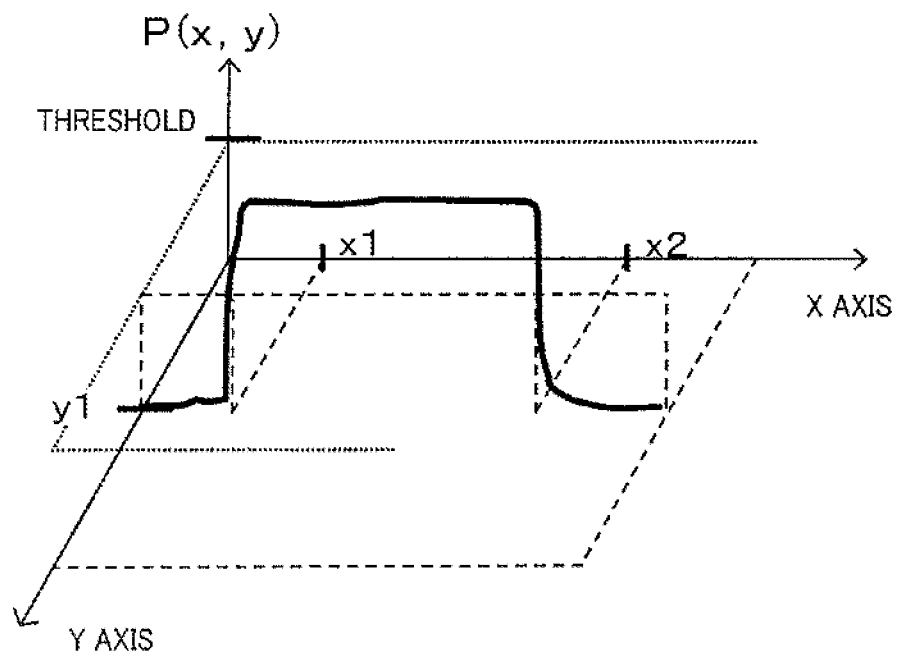
FIG. 9 is a diagram for explaining a method for detecting an area in which a pedestrian-crossing marking is present.
Figure 9B:
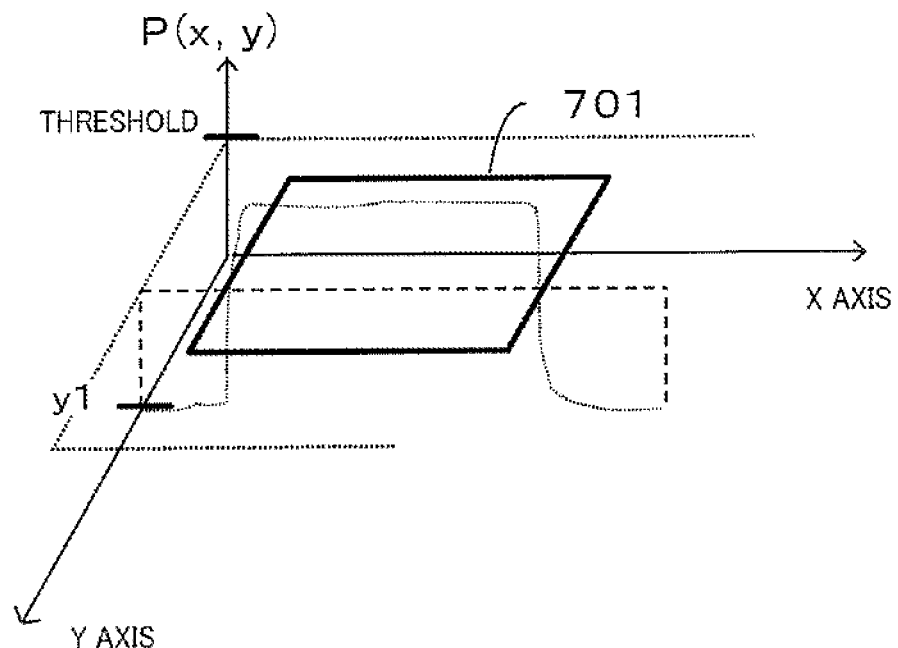

FIG. 9 is a diagram for explaining a method for detecting an area in which a pedestrian-crossing marking is present. FIG. 9A shows a frequency power P(x) in the calculation range at the Y coordinate (y1) as 3D data, and FIG. 9B shows a range in which the total sum P(x, y) of frequency power exceeds the predetermined threshold shown in FIG. 8B after a series of processings by period calculation section 103, frequency analyzing section 104 and area calculating section 105 described above are performed on the Y coordinate (y1) to the Y coordinate (ym) shown in FIG. 8A. Area 701 indicated by a solid line of FIG. 9 is a range exceeding the predetermined threshold in the total sum P(x, y), and a pedestrian-crossing marking is present in area 701.

Position outputting section 106 outputs coordinate data of area 701 detected by area detecting section 105.

With the above structure, a frequency analysis is performed based on the period of the pedestrian-crossing marking in the calculation range of the image data and an area in which the frequency power exceeds the predetermined threshold is detected as an area in which the pedestrian-crossing marking is present, so that the pedestrian-crossing marking can be detected without detecting intensity edges of the pedestrian-crossing marking, and thus the pedestrian-crossing marking can be detected even when the intensity edges are difficult to be detected.

There has been described above that all the horizontally-arranged ranges positioned at the Y coordinate (y1) are the calculation ranges by period calculating section 103, but an arbitrary coordinate point positioned at the Y coordinate (y1) may be a calculation range.

There has been described in the above explanation that a series of processings by period calculating section 103, frequency analyzing section 104 and area calculating section 105 are performed on any Y coordinate (y1), and then the series of processings are performed on other points on the Y axis to sum up the respective frequency powers P(x), but the method for realizing the present invention is not limited to thereto. In other words, the period calculation, frequency analysis and area calculation may be performed in parallel on the calculation range at all the Y coordinates in an arbitrary range on the Y axis.

In the above explanation, period calculating section 103 calculates a period of a painted portion of a pedestrian-crossing marking in image data for each item of image data obtained by image data obtaining section 102, but the period of the painted portion may be previously calculated and stored in the memory.

The square wave is used as the basis function in the above explanation, but the trigonometric function may be used as the basis function.

(Embodiment 2)

Figure 10:
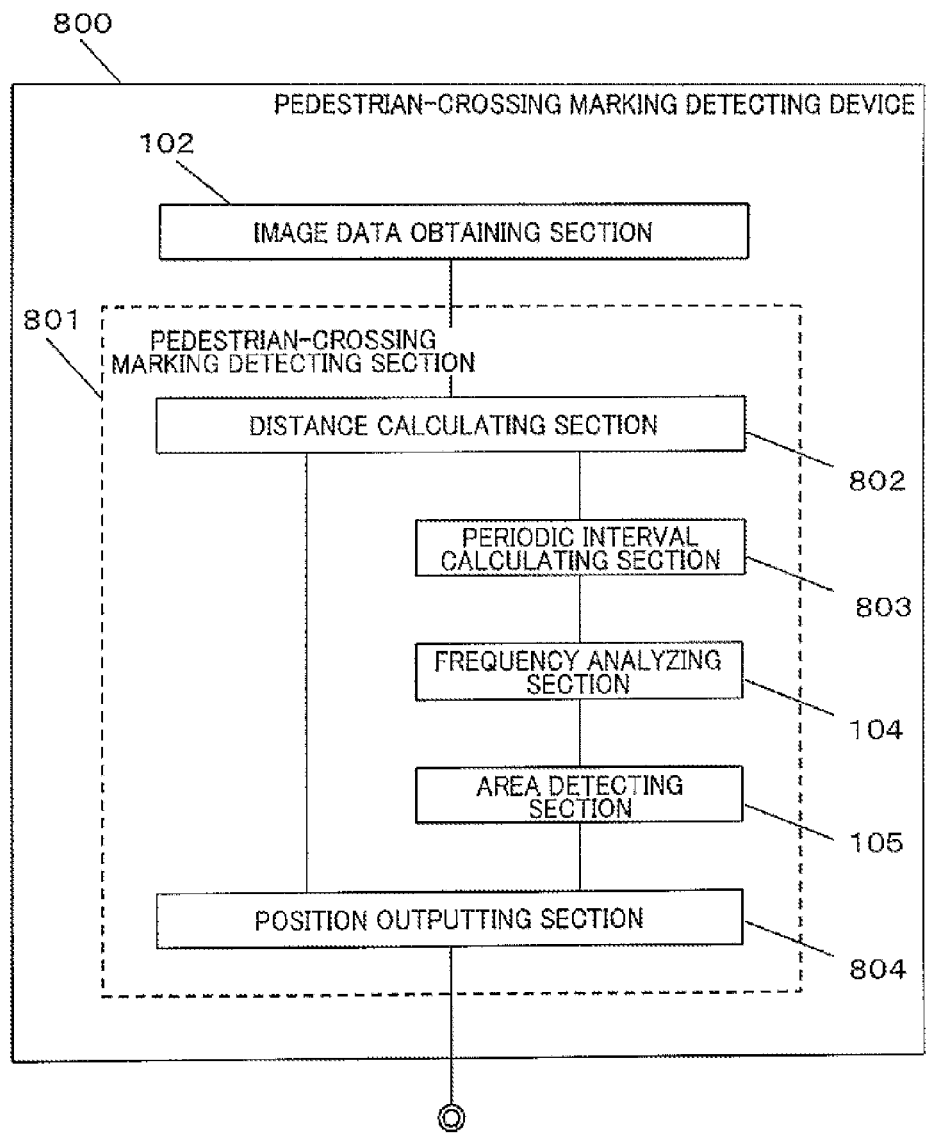
FIG. 10 is a diagram showing a block structure of a pedestrian-crossing marking detecting device according to Embodiment 2 of the present invention.

FIG. 10 shows a block structure of pedestrian-crossing marking detecting device 800 according to Embodiment 2. Embodiment 2 is different from Embodiment 1 in that distance calculating section 802, period calculating section 803 and position outputting section 804 are provided and periodic calculating section 103 and position outputting section 106 are not required.

Pedestrian-crossing marking detecting device 800 according to Embodiment 2 of the present invention will be described below. In FIG. 10, like reference numerals are denoted to the constituents having the same functions as those of Embodiment 1.

Image data obtaining section 102 obtains image data including a road surface. The image data obtaining method is similar to that of Embodiment 1 and thus an explanation thereof will be omitted.

Distance calculating section 802 extracts all the ranges or an arbitrary range on the X axis at any arbitrary Y coordinate (y1), as a calculation range, from the image data on the road surface obtained by image data obtaining section 102.

Distance calculating section 802 calculates a distance Dy1 in the real space between a camera and the road surface indicated in the calculation range. The distance Dyn (n: integer) is calculated from Equation 4 by use of the coordinates of the calculation range and the geometric parameters of the camera. The geometric parameters of the camera indicate the installation parameters of the camera including the installation pitch angle α, the camera installation height H, the camera focal length f, and the Y axis pixel pitch dpy, as described in Embodiment 1. yc indicates the center coordinate of the Y axis image.

(Equation 4)

$$D_{yn} = \frac{H \cdot \cos\theta_{yn}}{\sin(\alpha + \theta_{yn})}; \theta_{yn} = \arctan\left(\frac{dp_y \cdot (y - y_c)}{f}\right) \quad [4]$$

(n: Integer)

The installation pitch angle α and the installation height H change depending on bouncing or pitch motion of the vehicle, but the method for calculating a distance up to the road surface by use of the installation pitch angle α and the installation height H is exemplary and the present invention is not limited thereto. For example, other sensors such as vehicle height sensor or gyro sensor may be used to measure a change in pitch angle and a change in height for correction.

In response to the distance Dy1 calculated by distance calculating section 802, period calculating section 803 calculates the period Ty1 of the painted portion in the calculation range when the painted portion is captured in the calculation range irrespective of whether a pedestrian-crossing marking is present in the image data.

The period Tyn (n: Integer) is calculated from Equation 5 by use of the distance Dyn (n: Integer) calculated by distance calculating section 802, the width or interval (W) of the painted portion of the pedestrian-crossing marking in the real space, and the camera focal length f.

(Equation 5)

$$T_{yn} = \frac{2 \cdot W \cdot f}{D_{yn}} \quad [5]$$

(n: Integer)

The width or interval of the painted portion of the pedestrian-crossing marking (that is, the interval is the width of the non-painted portion) is assumed as W in Equation 5, but the sum of the width of the painted portion of the pedestrian-crossing marking and the width of the non-painted portion is assumed as W' and thus Equation 6 is obtained.

(Equation 6)

$$T_{yn} = \frac{W' \cdot f}{D_{yn}} \quad [6]$$

(n: Integer)

Tyn can be calculated from Equation 6, also when the widths of the painted portion and the non-painted portion of the pedestrian-crossing marking are different, the sum of the width of the painted portion and the width of the non-painted portion is constant and the painted portions and the non-painted portions are alternately repeated as in the rules of foreign countries.

Embodiment 2 is similar to Embodiment 1 in that period calculating section 803 can calculate the period Ty1 also when the vehicle is rotating, and thus an explanation thereof will be omitted.

Frequency analyzing section 104 analyzes the frequency of the image intensity in the calculation range by using the even function and the odd function of the square wave having the period Ty1 calculated by period calculating section 803 as the basis function. The function of frequency analyzing section 104 is similar to that of Embodiment 1, and thus an explanation thereof will be omitted.

Area detecting section 105 extracts an x coordinate at which the power level exceeds the predetermined threshold from the distribution of frequency power P(x) calculated by frequency analyzing section 104, and detects an area in which the extracted x coordinate is closely present as an area in which a pedestrian-crossing marking is present. The function of area detecting section 105 is similar to that of Embodiment 1, and thus an explanation thereof will be omitted.

Position outputting section 804 outputs the coordinate data on the area in which a pedestrian-crossing marking is present detected by area detecting section 105, and the information on the distance Dyn (n: integer) calculated by distance calculating section 802 together.

With the above structure, since the frequency analysis is performed based on the period of the pedestrian-crossing marking in the calculation range of the image data, and the area in which the frequency power exceeds the predetermined threshold is detected as the area in which a pedestrian-crossing marking is present, thus the intensity edges of the pedestrian-crossing marking do not need to be detected, so that even when the intensity edges of the painted portions are faint, the pedestrian-crossing marking can be detected and the distance from the camera to the pedestrian-crossing marking in the real space can be detected.

(Embodiment 3)

Figure 11:
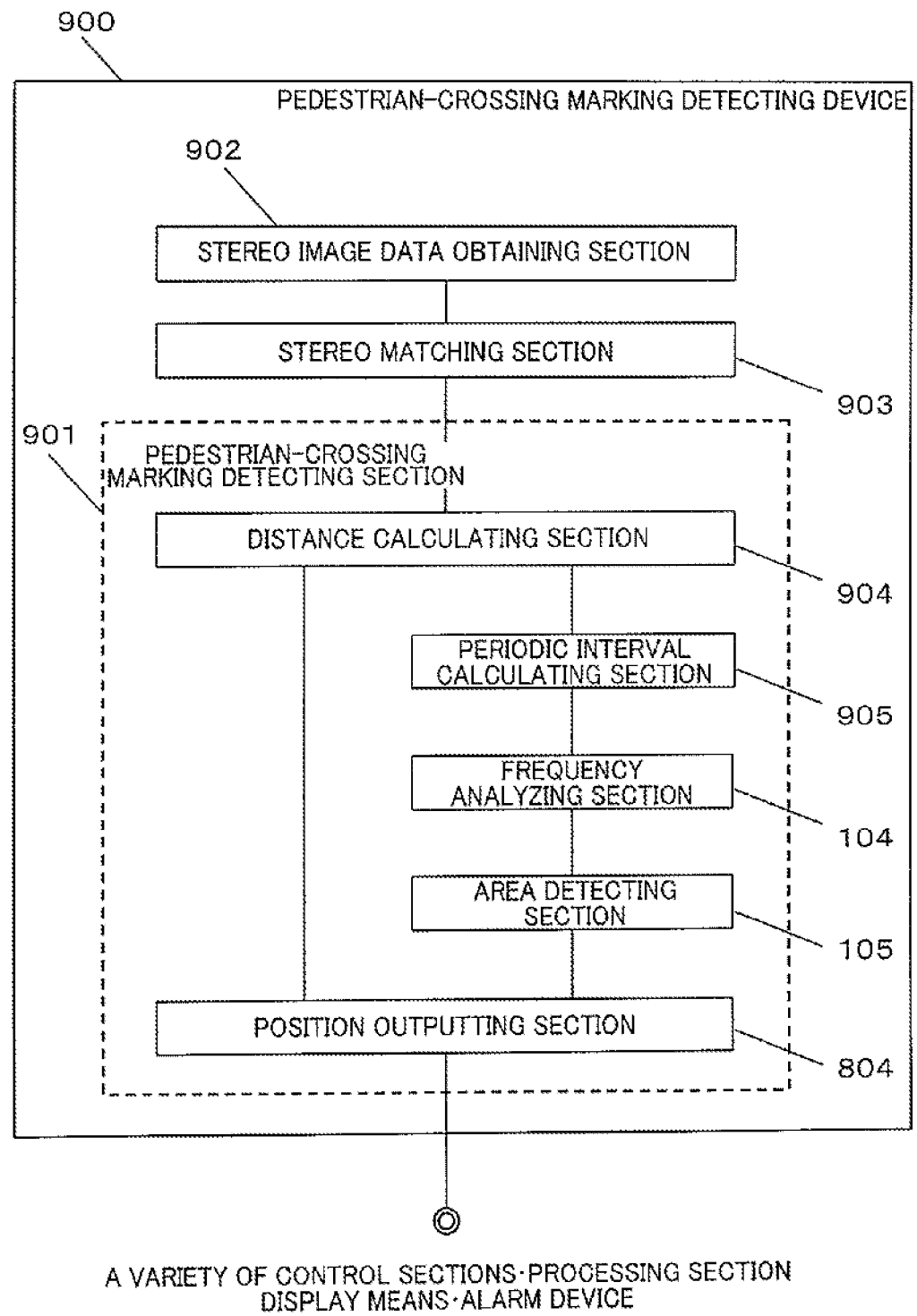
FIG. 11 is a diagram showing a block structure of a pedestrian-crossing marking detecting device according to Embodiment 3 of the present invention.

FIG. 11 shows a block structure of pedestrian-crossing marking detecting device 900 according to Embodiment 3. Embodiment 3 is different from Embodiment 1 in that the on-vehicle camera is a stereo camera mounting two imaging systems thereon, and stereo image data obtaining section 902, stereo matching section 903, distance calculating section 904, period calculating section 905 and position outputting section 804 are provided, and period calculating section 103 and position outputting section 106 are not required.

Pedestrian-crossing marking detecting device 900 according to Embodiment 3 is directed for solving a problem with a deterioration in accuracy of calculating the period of the painted portion in the image data when the painted portion of the pedestrian-crossing marking is included in the calculation range, by the fact that there is a change in the pitch angle of the camera facing the road surface when bouncing or pitching of the vehicle occurs or the road surface is tilted while the vehicle is running.

Pedestrian-crossing marking detecting device 900 according to Embodiment 3 of the present invention will be described below.

Stereo image data obtaining section 902 obtains image data on a road surface by an on-vehicle stereo camera mounting two imaging systems thereon. An explanation will be made assuming that the on-vehicle camera is installed on the front of the vehicle with the installation height H and the installation pitch angle α as shown in FIG. 3B, and the installation roll angle is zero. The on-vehicle stereo camera installing method is exemplary, is also applicable when the installation roll angle is present, and does not intend to limit the scope of the present invention.

Stereo matching section 903 uses a stereo camera having two cameras of target camera and reference camera to calculate distance data based on the principle of the triangulation.

Figure 12:
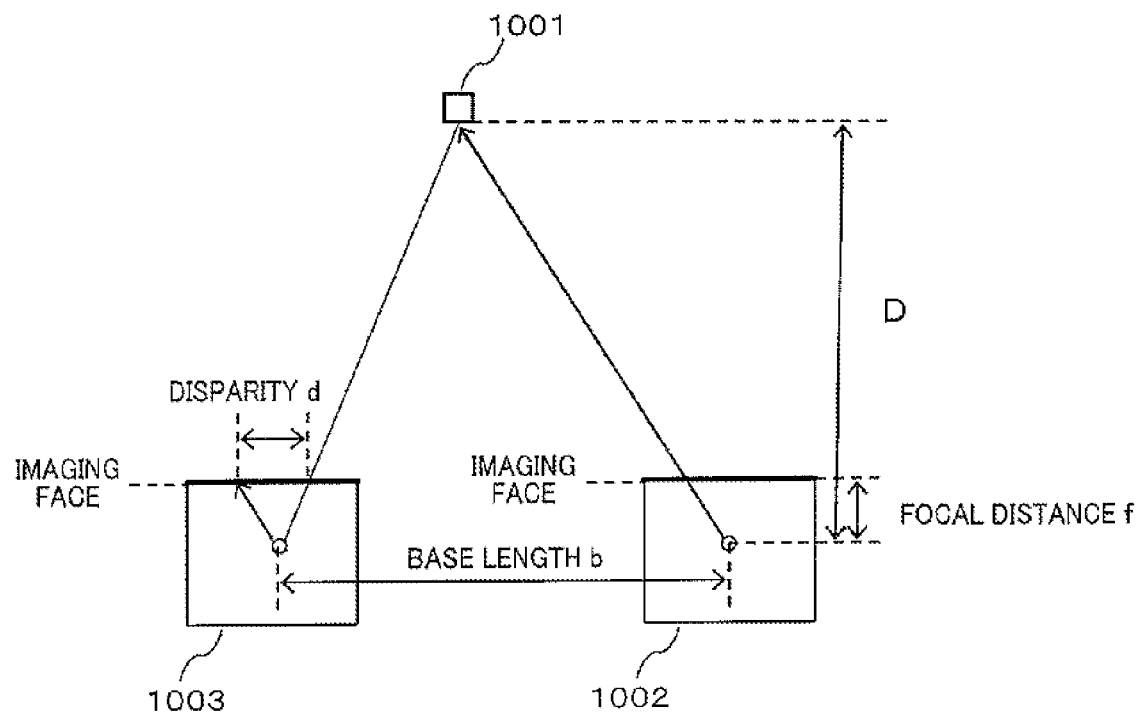
FIG. 12 is a diagram showing an outline of the triangulation principle of a stereo camera according to Embodiment 3 of the present invention.

FIG. 12 shows an outline of the calculation of the distances up to object 1001 by use of the principle of the triangulation by the stereo camera. When target camera 1002 and reference camera 1003 capture the same object 1001, the distance between the stereo camera and the object is calculated from Equation 7, based on the principle of the triangulation. A disparity d is a difference between the position of the object in a target image captured by the target camera and a position of the object in the reference image captured by the reference camera, and is calculated by stereo matching. A focal length f is a distance between the imaging device and the imaging area.

(Equation 7)

$$\text{(distance up to object)} = \frac{\text{(base length } b) \times \text{(focal distance } f)}{\text{(disparity } d)} \quad [7]$$

Figure 13A:
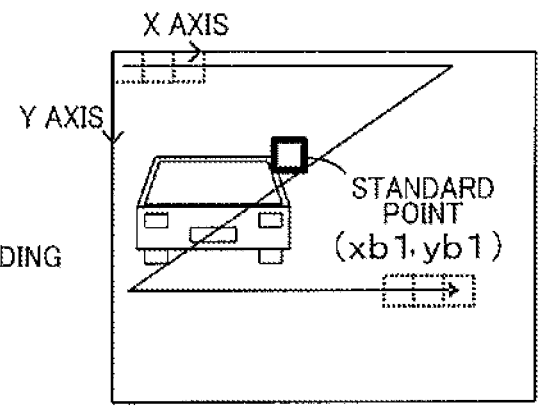
FIG. 13 is a diagram for explaining a disparity calculation.
Figure 13B:
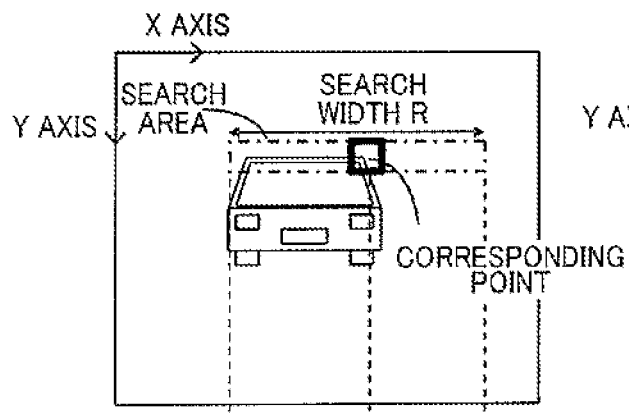
Figure 13C:
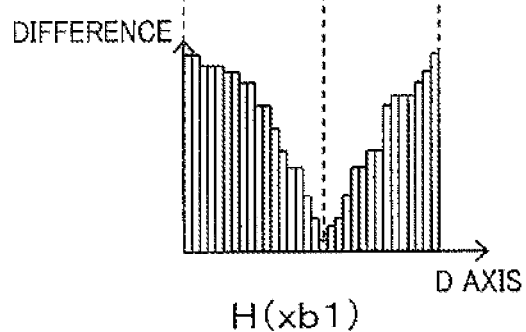

FIG. 13 is a diagram for explaining a disparity calculation. FIG. 13A shows a target image captured by the target camera in the image processing of calculating a disparity relative to the object, and FIG. 13B shows a reference image captured by the reference camera in the image processing of calculating a disparity relative to the object. The disparity calculating method sets a target point for the target image shown in FIG. 13A, and sets a search area in the reference image shown in FIG. 13B in association with the target point. As shown in FIG. 13C, an evaluation value distribution indicating a distribution of an evaluation value, which is a similarity between a peripheral intensity value of the target point and a periphery intensity value of a corresponding point candidate in the search area, is calculated, and a corresponding point candidate having the smallest evaluation value is calculated as a corresponding point.

An index of similarity may employ SAD (Sum of Absolute Differences), SSD (Sum of Squared differences), and NCC (Normalized Cross-Correlation), and does not limit the present invention.

With the above method, the distance data from the target camera to the road surface captured in the target image data is calculated.

Distance calculating section 904 uses the distance data calculated by stereo matching section 903 to calculate 3D voxel data of the target image. Distance calculating section 904 calculates a distance D from the target camera to the road surface captured in the target image based on the calculated 3D voxel data.

Figure 14:
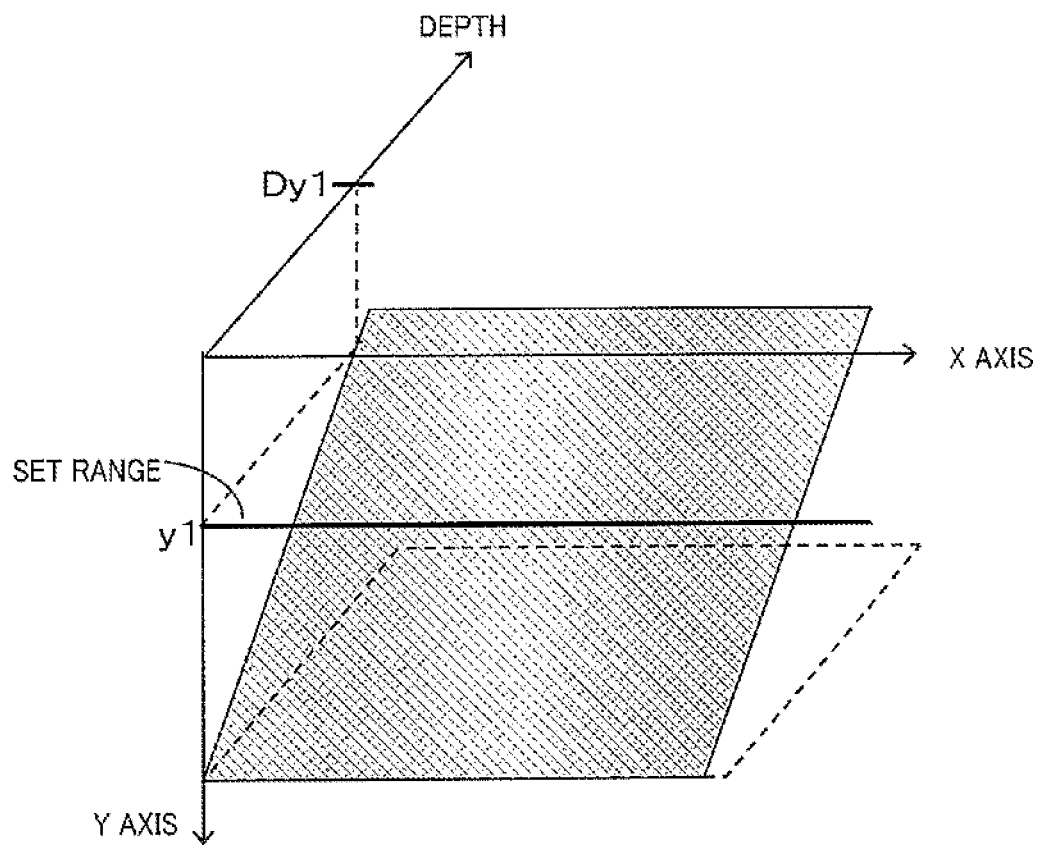
FIG. 14 is a diagram showing 3D voxel data.

FIG. 14 shows 3D voxel data of a road surface captured in a target image. The 3D voxel data is data on a coordinate space in which a depth axis is added to the image coordinate having the X axis and the Y axis, and one item of distance data is present for each point on the image coordinate. The road surface is a shadow portion on the 3D voxel data shown in FIG. 14.

In a shadow portion estimating method, a shadow portion can be calculated by a typical image processing, and for example, the shadow portion has the most data points in the 3D voxel data, and thus a plane in which a distribution of data points is closest can be estimated as a shadow portion by use of a maximum likelihood estimating method. One item of distance data is calculated for a calculation range, based on the estimated plane. In FIG. 14, the depth distance Dy1 of the road surface is decided for the calculation range in which the Y coordinate is y1, and the distance of the road surface in the calculation range can be calculated.

The distance Dy1 calculated based on the 3D voxel data is the same as Dy1 calculated from Equation 4 according to Embodiment 2. In other words, in Embodiment 3, Dy1 is calculated based on the 3D voxel data without using Equation 4 according to Embodiment 2.

Period calculating section 905 selects all the ranges or an arbitrary range on the X axis at an arbitrary Y coordinate (y1), as the calculation range from the target image data. Period calculating section 905 calculates the period Tyn (n: integer between 1 and m) of the painted portion in the calculation range when the painted portions of the pedestrian-crossing marking is assumed to be present in the calculation range included in the target image data.

The period Tyn (n: integer between 1 and m) of the painted portion is calculated from Equation 5 according to Embodiment 2, by use of the distance Dyn (n: integer) calculated by distance calculating section 904, the width or interval (W) of the painted portion of the pedestrian-crossing marking in the real space, and the camera focal length f.

The period Tyn (n: integer between 1 and m) of the painted portion is calculated from Equation 6 according to Embodiment 2, by use of the distance Dyn (n: integer), the sum (W') of the width of the painted portion of the pedestrian-crossing marking in the real space and the width of the non-painted portion, and the camera focal length f. Tyn has the same value even using both Equation 5 and Equation 6.

Embodiment 1 is such that frequency analyzing section 104 and area detecting section 105 perform the information processing based on the image data, while Embodiment 3 is the same as Embodiment 1 except that Embodiment 3 performs the information processing based on the target image data, and thus an explanation thereof will be omitted. The explanation of position outputting section 804 has been made in Embodiment 2 and thus will be omitted.

With the above structure, when bouncing or pitching occurs in a vehicle or when a road surface is tilted, since the 3D voxel data is previously calculated to calculate the distance based on the 3D voxel data even when the pitch angle of the camera relative to the road surface changes while the vehicle is running; therefore, it is possible to calculate the period of the pedestrian-crossing marking in a simple method also in this case.

(Embodiment 4)

Figure 15:
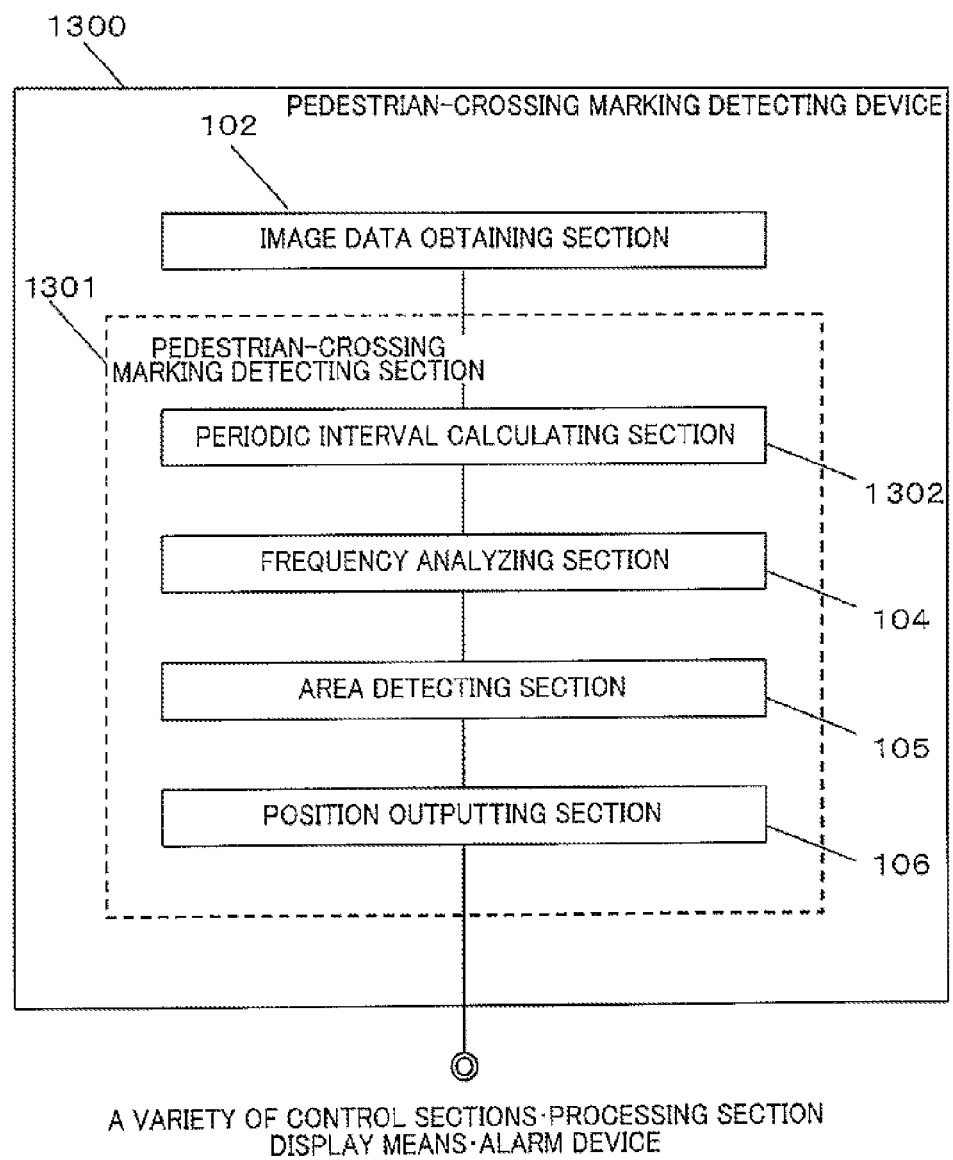
FIG. 15 is a diagram showing a block structure of a pedestrian-crossing marking detecting device according to Embodiment 4 of the present invention.

FIG. 15 shows a block structure of pedestrian-crossing marking detecting device 1300 according to Embodiment 4. Embodiment 4 is different from Embodiment 1 in that period calculating section 1302 is provided and period calculating section 103 is not required in pedestrian-crossing marking detecting section 1301.

A pedestrian-crossing marking is obliquely captured on image data when a vehicle is rotating and running. Pedestrian-crossing marking detecting section 1300 according to Embodiment 4 applies the period calculating method according to Embodiment 1 when painted portions of the pedestrian-crossing marking are not uniformly arranged in the horizontal direction on the image data.

Pedestrian-crossing marking detecting device 1300 according to Embodiment 4 of the present invention will be described below. The components other than period calculating section 1302 included in pedestrian-crossing marking detecting device 1300 have been described in Embodiment 1, and thus an explanation of the functions thereof will be omitted.

Figure 16:
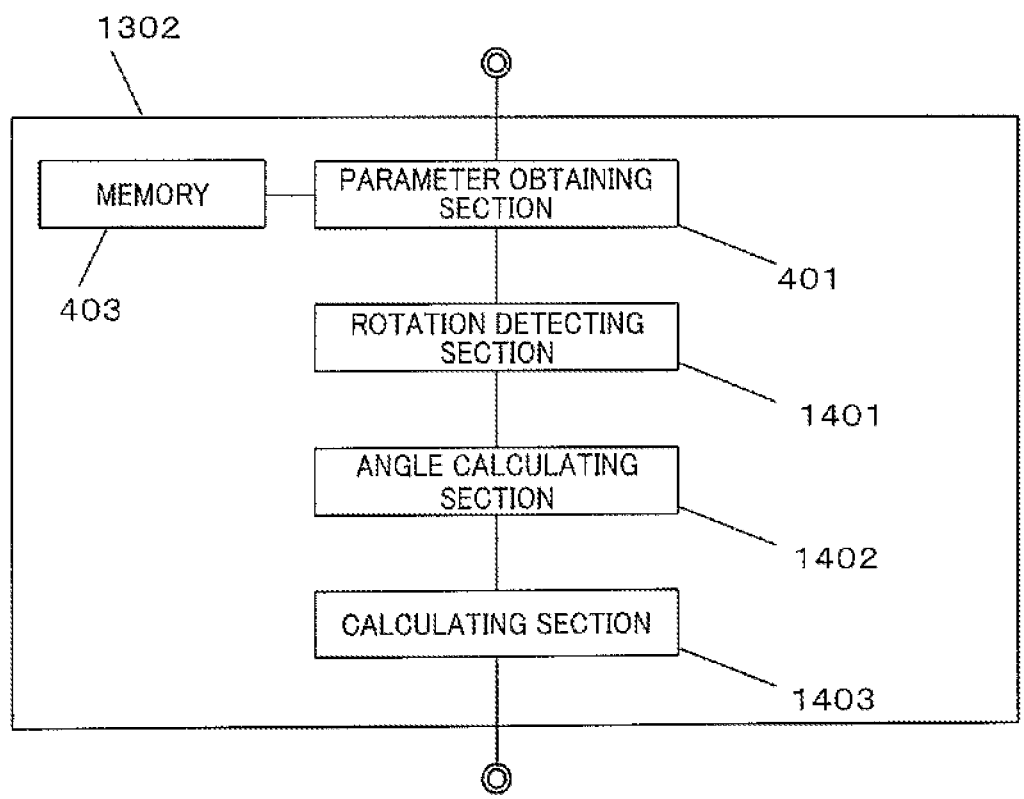
FIG. 16 is a diagram showing a structure of a period calculating section.

FIG. 16 shows a block structure of period calculating section 1302. Period calculating section 1302 includes parameter obtaining section 401, memory 403, rotation detecting section 1401, angle calculating section 1402, and calculating section 1403. Memory 403 previously stores the geometric parameters of the camera and the predefined values of the pedestrian-crossing marking therein.

In period calculating section 1302, parameter obtaining section 401 receives the image data from image data obtaining section 102 to select a Y coordinate (yn) in the calculation range, and reads the geometric parameters of the camera and the predefined values of the pedestrian-crossing marking from memory 403.

Rotation detecting section 1401 has a sensor such as rudder angle sensor or yaw rate sensor, and when a change value of the angle speed obtained by the rudder sensor or yaw rate sensor is larger than a predetermined threshold, rotation detecting section 1401 detects that the vehicle mounting the pedestrian-crossing marking detecting device thereon rotates.

When rotation detecting section 1401 detects a rotation, angle calculating section 1402 calculates a rotation angle γ based on the detected change value of the angle speed. The rotation angle γ is assumed as an absolute value of displacement relative to the angle while the vehicle travels straight.

Calculating section 1403 calculates a period Ty based on the read parameters from Equation 8.

(Equation 8)

$$T_{yn} = \frac{2 \cdot W \cdot f \cdot \sin(\alpha + \theta_{yn})}{H \cdot \cos\theta_{yn} \cdot \cos\gamma}; \theta_{yn} = \arctan\left(\frac{dp_y \cdot (y_n - y_c)}{f}\right) \quad [8]$$

The width or interval (that is, the interval is the width of the non-painted portion) of the painted portion of the pedestrian-crossing marking is assumed as W in Equation 8, but the sum of the width of the painted portion of the pedestrian-crossing marking and the width of the non-painted portion thereof is assumed as W' and thus Equation 9 is obtained.

(Equation 9)

$$T_{yn} = \frac{W' \cdot f \cdot \sin(\alpha + \theta_{yn})}{H \cdot \cos\theta_{yn} \cdot \cos\gamma}; \theta_{yn} = \arctan\left(\frac{dp_y \cdot (y_n - y_c)}{f}\right) \quad [9]$$

Tyn can be calculated from Equation 9 even when the widths of a painted portion and a non-painted portion of a pedestrian-crossing marking are different, the sum of the width of the painted portion and the width of the non-painted portion is constant, and the painted portions and the non-painted portions are alternately repeated as in the rules of many countries.

The geometric parameters of the camera and the predefined values of the pedestrian-crossing marking are previously stored in the memory provided in pedestrian-crossing marking detecting device 1300.

With the structure, also while the vehicle is rotating, period calculating section 1301 can calculate the period of the painted portion in the calculation range when the painted portion of the pedestrian-crossing marking is present in the calculation range.

The disclosed contents of Specification, Drawings and Abstract included in Japanese Patent Application 2009-223976 fined on Sep. 29, 2009 are all incorporated in the present application.

INDUSTRIAL APPLICABILITY

The pedestrian-crossing marking detecting device according to the present invention is useful for detecting a pedestrian-crossing marking from an imaging screen, even a pedestrian-crossing marking in which intensity edges of painted portions are faint.

REFERENCE SIGNS LIST

100 Pedestrian-crossing marking detecting device
101 Pedestrian-crossing marking detecting section
102 Image data obtaining section
103 Period calculating section
104 Frequency analyzing section
105 Area detecting section
106 Position outputting section
401 Parameter obtaining section
402 Calculating section
403 Memory
501 Even function
502 Odd function
701 Pedestrian-crossing marking area
800 Pedestrian-crossing marking detecting device
801 Pedestrian-crossing marking detecting section
802 Distance calculating section
803 Period calculating section
804 Position outputting section
900 Pedestrian-crossing marking detecting device
901 Pedestrian-crossing marking detecting section
902 Stereo image data obtaining section
903 Stereo matching section
904 Distance calculating section
905 Period calculating section
1001 Object
1002 Target camera
1003 Reference camera
1300 Pedestrian-crossing marking detecting device
1301 Pedestrian-crossing marking detecting section
1302 Period calculating section
1401 Rotation detecting section
1402 Angle calculating section
1403 Calculating section
1500 Pedestrian-crossing marking detecting device
1501 Stereo image data obtaining section
1502 Distance data calculating section
1503 Pedestrian-crossing marking detecting section
1504 Intensity edge detecting section
1505 Width deciding section
1506 Interval deciding section
1507 Repetition deciding section

The invention claimed is:

1. A pedestrian-crossing marking detecting device comprising:
an image data obtaining section that has a first imaging system and obtains image data on a road surface captured by the first imaging system;
a period calculating section that calculates a period of painted portions on the image data when the painted portions of a pedestrian-crossing marking are included in a calculation range of the image data, based on coordinates of the calculation range, geometric parameters of the first imaging system and predefined values of the pedestrian-crossing marking;
a frequency analyzing section that analyzes a frequency of an image intensity in the calculation range and calculates a frequency power distribution, based on the basis function in which the integral multiple of the period of the painted portions is assumed as one period;
an area detecting section that extracts a coordinate point at which a power level in the frequency power distribution is larger than a predetermined threshold from the calculation range, and detects an area in which the coordinate point is present as a pedestrian-crossing marking area; and
a position outputting section that outputs coordinate data on the pedestrian-crossing marking area in the image data.

2. The pedestrian-crossing marking detecting device according to claim 1, wherein the period calculating section comprises:
a memory section that previously stores geometric parameters of the first imaging system and predefined values of the pedestrian-crossing marking therein;
a parameter obtaining section that obtains the coordinates of the calculation range from the image data obtaining section, and obtains the geometric parameters of the first imaging system and the predefined values of the pedestrian-crossing marking from the memory section; and
a calculating section that calculates a period of the painted portions, based on the coordinates of the calculation range, the geometric parameters of the first imaging system, and the predefined values of the pedestrian-crossing marking.

3. The pedestrian-crossing marking detecting device according to claim 1, wherein the period calculating section comprises:
a memory section that previously stores the geometric parameters of the first imaging system and the predefine values of the pedestrian-crossing marking therein;
a parameter obtaining section that obtains the coordinates of the calculation range from the image data obtaining section, and obtains the geometric parameters of the first imaging system and the predefined values of the pedestrian-crossing marking from the memory section;
a rotation detecting section that has a sensor for detecting a change in angle speed, and when a change in angle speed detected by the sensor is larger than a predetermined threshold, detects a rotation of the pedestrian-crossing marking detecting device;
an angle calculating section that when a rotation of the pedestrian-crossing marking detecting device is detected, calculates a rotation angle based on a change value of the angle speed detected by the sensor; and
a calculating section that calculates a period of the painted portions, based on the coordinates of the calculation range, the geometric parameters of the first imaging system, the predefined values of the pedestrian-crossing marking, and the rotation angle.

4. The pedestrian-crossing marking detecting device according to claim 1, further comprising a distance calculating section that calculates a distance in a real space between the first imaging system and a road surface indicated in the calculation range as distance data, based on the coordinates of the calculation range included in the image data and the geometric parameters of the first imaging system,
wherein the period calculating section calculates a period of painted portions when the painted portions of a pedestrian-crossing marking are included in the calculation range, based on the distance data and the predefined values of the pedestrian-crossing marking, and the position outputting section outputs coordinate data on the pedestrian-crossing marking area in the image data, and the distance data.

5. The pedestrian-crossing marking detecting device according to claim 1, further comprising a stereo matching section and a distance calculating section, wherein the image data obtaining section further has a second imaging system, and obtains target image data in which a road surface is captured by the first imaging system and reference image data in which the road surface is captured by the second imaging system, the stereo matching section calculates an evaluation value distribution indicating a difference in image intensity between a target point of the target image data and multiple search points of the reference image data, and calculates a distance in a real space between the first imaging system and the road surface captured in the target image data as first distance data based on a disparity calculated based on the evaluation value distribution, a focal length of the first imaging system, and a distance between the first imaging system and the second imaging system, the distance calculating section calculates 3D voxel data of the target image data based on the first distance data, and calculates a distance in a real space between the first imaging system and the road surface indicated in the calculation range included in the target image data, as second distance data, based on the 3D voxel data, the period calculating section calculates a period of painted portions when the painted portions of a pedestrian-crossing marking are included in the calculation range, based on the second distance data and the predefined values of the pedestrian-crossing marking, and the position outputting section outputs coordinate data on the pedestrian-crossing marking area in the target image data, and the second distance data.

6. The pedestrian-crossing marking detecting device according to any of claims 1, 4 and 5, wherein the geometric parameters of the first imaging system and the second imaging system are an installation pitch angle, an installation height, a focal length and a pixel pitch of the imaging systems.

7. The pedestrian-crossing marking detecting device according to any of claims 1, 4 and 5, wherein the frequency analyzing section analyzes a frequency based on the basis function in which one period is twice as much as the period of the painted portions.

8. The pedestrian-crossing marking detecting device according to any one of claims 1, 4 and 5, wherein the area detecting section controls the predetermined threshold based on an illumination of a surrounding area of the vehicle.

9. A pedestrian-crossing marking detecting method comprising the steps of:

obtaining image data on a road surface captured by an imaging system;

calculating a period of painted portions when the painted portions of a pedestrian-crossing marking are included in a calculation range of the image data, based on coordinates of the calculation range, geometric parameters of the imaging system, and predefined values of the pedestrian-crossing marking;

performing a frequency analysis of an image intensity in the calculation range and calculating a frequency power distribution, based on the basis function in which the integral multiple of the period of the painted portions is assumed as one period;

extracting a coordinate point at which a power level in the frequency power distribution is larger than a predetermined threshold from the calculation range, and detecting an area in which the coordinate point is present as a pedestrian-crossing marking area; and outputting coordinate data on the pedestrian-crossing marking area in the image data.

10. The pedestrian-crossing marking detecting method according to claim 9, wherein the geometric parameters of the imaging system include an installation pitch angle, an installation height, a focal length, and a pixel pitch of the imaging system.

* * * * *